INVENTOR.
Pearl R. Ogle, Jr.

ATTORNEY

United States Patent Office 3,697,235
Patented Oct. 10, 1972

3,697,235
METHOD OF PURIFYING URANIUM HEXAFLUORIDE BY REDUCTION TO LOWER URANIUM FLUORIDES
Pearl R. Ogle, Jr., Chillicothe, Ohio, assignor to the United States of America as represented by the United States Atomic Energy Commission
Filed Mar. 31, 1960, Ser. No. 19,132
Int. Cl. C01g 43/06
U.S. Cl. 23—346   16 Claims

ABSTRACT OF THE DISCLOSURE

The invention relates to the purification of uranium hexafluoride contained in gaseous mixtures by reduction to lower uranium fluorides through formation of an intermediate compound having the empirical formula $UF_6N(O)_x$, where $x$ is a number from 1 to 2.

---

Figure 1:
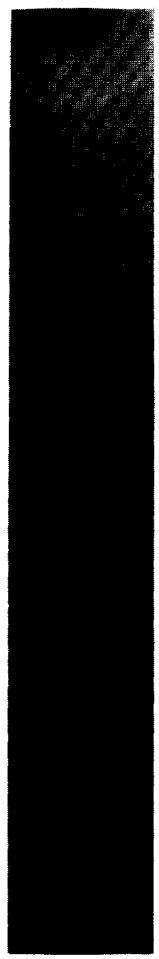

The present invention relates generally to a new and useful class of chemical reactions involving uranium hexafluoride. More particularly, it relates to a new and useful method of purifying uranium hexafluoride by conversion to pentavalent and tetravalent uranium fluorides by the application of this new class of chemical reactions.

There are many routes to the production of uranium hexafluoride. A number of preparatory methods for uranium hexafluoride are disclosed in Chapter VIII of "The Chemistry of Uranium" by Katz and Rabinowitch, National Nuclear Energy Series, VIII–V, McGraw-Hill, 1951. Another source of uranium hexafluoride comes from so-called fluoride volatility processes wherein the ureanium is separated from a uranium-containing composition by conversion of the uranium to the volatile hexafluoride. A process of this type is described in U.S. Pat. 2,830,873.

Regardless of its source, a synthesized $UF_6$ product is usually found as a component of a gaseous mixture from which it must be separated to a high degree of purity. A highly purified uranium hexafluoride is required in a gaseous diffusion process to separate the isotopes of uranium The volatile impurities must be reduced to a level in the parts per million range or less for efficient isotope separation and for other uses. The most common volatile impurities in a gaseous stream containing uranium hexafluoride include gaseous fluorine, chlorine, bromine, oxygen, inert gases such as argon, nitrogen, carbon dioxide, hydrogen fluoride, volatile inorganic fluorides, volatile fluorocarbons such as the Freons, interhalogens such as $ClO_2F$, $ClO_3F$, $ClF_3$, $ClF$, etc.

It is a principal object of this invention to provide a method of removing and purifying gaseous uranium hexafluoride from a gaseous stream.

Another object of this invention is to convert gaseous uranium hexafluoride into a form from which uranium hexafluoride can easily be regenerated.

A further object of this invention is to provide a method of converting uranium hexafluoride into useful pentavalent and tetravalent uranium fluorides.

A major object of this invention is to provide a novel class of chemical reactions and a new and useful class of uranium compounds resulting therefrom whereby the preceding objects can be achieved.

With the above and other objects in mind, the present invention comprises, in its broadest aspect, a method of selectively separating uranium hexafluoride from a gaseous stream containing said uranium hexafluoride and extraneous gaseous impurities which comprise the steps of contacting said gaseous stream with an oxide of nitrogen having an atomic ratio of oxygen to nitrogen at least equal to one, and thereafter separating a solid uranium fluoride product having an empirical formula, $UF_6N(O)_x$, where $x$ is a number from 1 to 2.

A second aspect of my invention relates to the versatility and ease with which the $UF_6N(O)_x$ product can be converted into other useful uranium fluorides. For example, uranium hexafluoride may be easily regenerated from a hydrogen fluoride solution of $UF_6N(O)_x$ by contacting said solution with a fluorinating agent such as chlorine trifluoride at room temperature; a double uranium fluoride salt may be easily generated from a hydrofluoric acid solution of $UF_6N(O)_x$ by contacting said solution with a soluble salt containing the desired metal variety. For example to form $KUF_6$ a soluble salt such as KF, or $KNO_3$ may be added to the solution and, finally, the $UF_6N(O)_x$ product can easily be converted to uranium tetrafluoride by several routes to be described more fully hereinafter.

The following examples will serve to illustrate the operation and multifold utility of the various aspects of my invention in further detail.

EXAMPLE I

This example illustrates the preparation of nitrosylium hexafluorouranate, $UF_6NO$.

Uranium hexafluoride (13.665 grams, 0.0388 mole) was condensed into a vacuum-tight nickel reactor at $-196°$ C. Nitric oxide (1.283 grams, 0.04275 mole) was then condensed atop of the uranium hexafluoride at the same temperature. The reactor was then warmed to room temperature and then heated for 16 hours at 90° C. The large pressure rise one would have expected on heating the $UF_6$ and NO mixture to room temperature was not obtained, indicating the occurrence of a reaction even at the very low temperatures. The reactor was then cooled to room temperature and any excess gases were removed by evacuation. A greenish-white solid (14.76 grams) was collected from the reactor.

The reaction between $UF_6$ and NO was repeated a number of times as above, except that in each case the time of contact was varied from a few seconds to three days. In each case, a greenish-white precipitate formed. The solid products from each run were subjected to elemental analysis. A summary of some representative runs including a representative analysis is shown in Table I below.

TABLE I.—PREPARATION AND ANALYSIS OF NITROSYLIUM HEXAFLUOROURANATE

| Grams of— | | Time of contact, hours | $UF_6NO$ (grams) | |
|---|---|---|---|---|
| $UF_6$ | NO | | Obtained | Calculated |
| 13.990 | 2.360 | 70 | 15.070 | 15.182 |
| 13.665 | 1.283 | 16 | 14.760 | 14.830 |
| 14.829 | 1.924 | 48 | 15.958 | 16.093 |
| 16.268 | 1.587 | 24 | 17.566 | 17.655 |
| 24.454 | 2.630 | ca. 5 | 26.524 | 26.538 |

Representative analysis: *Analysis.*—Calcd. for $UF_6NO$ (percent): U, 62.31; F, 29.84; NO, 7.85. Found (percent): U, 62.36; F, 29.72; NO, 7.38.

It will be seen that the chemical analysis from each run corresponds to the stoichiometric ratios required for a compound having an empirical formula $UF_6NO$.

In further experiments, the reaction of nitric oxide with uranium hexafluoride was conducted, at temperatures in the range $-196°$ C. to as much as 150° C. by reaction of either gaseous or liquid NO with either solid, liquid or gaseous $UF_6$. A greenish-white solid corresponding to the empirical formula $UF_6NO$ was formed in each case.

The greenish-white solid was found to have a vapor pressure of less than 1 millimeter mercury at 25° C. $UF_6NO$, named nitrosylium hexafluorouranate, is a uranium compound wherein the uranium is believed to be in +5 oxidation state. Its solid density, as determined by volume displacement in carbon tetrachloride, is about 4.3 grams per cubic centimeter. It reacts with acetone, methanol and trichloroethylene to form a brownish-black solid product while liberating nitric oxide gas. It is insoluble and insert to carbon tetrachloride, trichlorotrifluoroethane (Freon–113), dinitrogen tetroxide and monochlorobenzene. It is soluble in anhydrous hydrogen fluoride to the extent of approximately 0.2 of a gram per gram of hydrogen fluoride and in hydrofluoric acid solutions having a hydrogen fluoride content of at least 15 percent by weight. It is relatively stable in dry air up to a temperature of about 150° C., losing under these conditions only about 0.7 percent by weight. At higher temperatures the compound decomposes to $UF_6$ and other materials.

Nitrosylium hexafluorouranate is substantially inert to liquid or gaseous chlorine trifluoride and fluorine at temperatures in the range 60 to 90° C.; however, at temperatures in the range 95 to 120° C., about 14 percent is converted to uranium hexafluoride after about 20 hours, in a reaction mixture containing a mole ratio of either chlorine trifluoride or fluorine to $UF_6NO$ of about 3.

A powder X-ray diffraction pattern was obtained of the greenish-white product produced as above. These data were obtained using a 114.59 diameter powder camera and copper $K\alpha$ radiation (weighted mean value for Cu $K\alpha$ radiation wavelength=0.54178 A.) filtered through nickel foil. A photographic reproduction of the diffraction pattern of this product is shown in FIG. 1. Based on its chemical analysis and measured density, given above, in conjunction with the data derived from the diffraction pattern shown in FIG. 1, it was concluded that unit cell dimension of the compound, $A_o$, is equal to 5.17 A. and is due to a compound having the chemical formula $UF_6NO$.

An infrared spectrum of $UF_6NO$ was taken in the range 500 cm.$^{-1}$ to about 2500 cm.$^{-1}$. Two well-defined absorption peaks were noted at 508 and 550 cm.$^{-1}$ indicating the $UF_6^-$ ion; a sharp well-defined absorption peak was also observed at 2333 cm.$^{-1}$, this being indicative of the $NO^+$ ion.

EXAMPLE II

The nitrosylium hexafluorouranate, $UF_6NO$ as prepared in Example I was dissolved in anhydrous hydrogen fluoride. The resultant solution was then treated further. Gaseous chlorine trifluoride was bubbled through the solution at a temperature of about 25° C. and a gaseous product was collected which was identified as uranium hexafluoride.

In further experiments the solid material $UF_6NO$ was exposed to gaseous fluorine at temperatures from 375 to 400° C. and found to be converted to uranium hexafluoride. Similar treatment at temperatures from 95 to 120° C. for 20 hours showed only partial conversions of the $UF_6NO$ to uranium hexafluoride as described in Example I.

EXAMPLE III

The greenish-white solid produced in Example I was stored in a polyethylene container filled with dry air. After about 6 months the solid was subjected to chemical and X-ray analysis. It was found that the solid had remained unchanged and had not reacted with the polyethylene. In similar experiments it was also found that the $UF_6NO$ was inert to other container materials such as nickel, aluminum, and glass.

EXAMPLE IV

A sample of the greenish-white solid produced as in Example I was mixed with water at a temperature of about 25° C. and filtered promptly. The gaseous and liquid phases were then analyzed by chemical and mass spectrometer means. The gaseous phase was found to consist of nitric oxide and the liquid phase with the precipitate contained nitric acid, hydrofluoric acid and substantially equal molar quantities of uranium tetrafluoride and uranyl fluoride. This indicates that nitrosylium hexafluorouranate is hydrolyzed by water in accordance with the following equation:

$$6UF_6NO + 10HOH \rightarrow 3UF_4 + 3UO_2F_2 + 4NO + 18HF + 2HNO_3$$

Hydrolysis calculated for U (IV); 31.15; U (VI) 31.15. Found: U (IV) 31.40; U (VI) 31.27.

EXAMPLE V 40.5 grams of the $UF_6NO$ product obtained as in Example I was placed in a vacuum-tight nickel-tube reactor. Hydrogen gas at the rate of 1000 cc. per minute was then allowed to flow over it. The tube reactor was heated to a temperature in the range 330 to 350° C. and maintained at temperature for a period of about 30 minutes. After cooling the reactor to room temperature, 33.0 grams of a green solid was collected. By chemical analysis and by interpretation of its X-ray diffraction pattern the green solid was identified as uranium tetrafluoride. Analysis was 75.75 percent uranium; calculated for uranium tetrafluoride equaled 75.80 percent uranium. The theoretical weight of uranium tetrafluoride expected for this reduction was 33.3 grams. Substantially complete reduction of $UF_6NO$ with hydrogen can be obtained at a temperature as low as 200° C., but a higher reaction time is required.

EXAMPLE VI 1.029 grams of $UF_6NO$ (0.0027 mole) and 0.0037 mole of carbon monoxide were placed in a vacuum-tight nickel reactor. The reactor was heated to a temperature of about 290° C. and maintained at temperature for about 2 hours, after which the gaseous products were removed by evacuation at room temperature. A dark green solid (0.825 gram) was collected and identified as uranium tetrafluoride by chemical analysis for uranium (75.64 percent) and by identification through X-ray diffraction analysis. The calculated weight of uranium tetrafluoride for this reaction assuming complete conversion was 0.846 gram. Conversion of $UF_6NO$ to $UF_4$ may be obtained at a temperature as low as 200° C. at a somewhat longer reaction time.

EXAMPLE VII 60.08 grams of $UF_6NO$ was dissolved in 400 milliliters of 48 percent hydrofluoric acid. To the resulting solution was added 6.04 grams of copper sulfate ($CuSO_4 \cdot 5H_2O$) and 93 milliliters of concentrated hydrochloric acid and about 500 milliliters of water were then added to form an aqueous solution. Gaseous sulfur dioxide was then passed through the stirred solution at the rate of about 0.2 liter per minute. The stirred solution was heated to a temperature of about 90° C. and maintained at temperature for about 5 hours. At the completion of the reaction time the system was allowed to cool to room temperature. A finely divided precipitate was filtered from solution. The precipitate was washed with 300 milliliter portions of water and dried for 1½ hours at 115° C. The precipitate weighed 51.7 grams and was identified as $UF_4 \cdot ¾H_2O$ as determined by standard analytical methods of analysis. The product analyzed 72.21 percent uranium and 22.38 percent fluorine. The calculated uranium and fluorine content for $UF_4 ¾ H_2O$ is 72.68 percent and 23.20 percent, respectively.

EXAMPLE VIII

To a 2 liter glass bulb was added gaseous uranium hexafluoride at room temperature until the pressure reached 100 millimeters mercury. This bulb was connected by a glass stopcock to another 2 liter glass bulb which contained 150 millimeters pressure of gaseous nitrogen dioxide. The stopcock between the two bulbs was opened and a yellowish-white solid formed immediately as the gases mixed. Excess gas was evacuated from each of the two bulbs and the solid product was thereafter collected under a moisture-free atmosphere. By chemical analysis the solid was identified as having a formula of $UF_6NO_2$. Found: Uranium 59.95 percent; F, 28.57 percent; N, 3.52 percent. Theory based on $UF_6NO_2$: U, 59.80 percent, F, 28.64 percent; N, 3.52 percent.

Figure 2:

An X-ray diffraction pattern of the solid is shown in FIG. 2.

EXAMPLE IX

In a nickel reactor such as the one used in Example I solid uranium hexafluoride (10.032 grams, 0.0285 mole) was contacted with liquid dinitrogen tetraoxide (4.457 grams, 0.0969 mole) at about 25° C. for a period of about 64 hours. The reactor was evacuated to remove gaseous contaminants which were identified as $NO_2$ and oxygen. After removal of the volatile constituents there remained 10.896 grams identified as $UF_6NO$ by chemical analysis and by its X-ray diffraction pattern. The calculated weight of $UF_6NO$ was 10.890 grams, assuming the reaction to proceed according to the following equation:

$$2UF_6 + N_2O_4 \rightarrow 2UF_6NO + O_2$$

EXAMPLE X

In a system similar to the one described in Example VIII, gaseous nitrogen dioxide at 75 millimeters mercury pressure was allowed to mix with gaseous $UF_6$ at 100 millimeters pressure for a period of 3 to 5 minutes at room temperature. The excess uranium hexafluoride was then removed by evacuation. This procedure was repeated 20 times and produced 32.3 grams of a solid which was identified by chemical and X-ray diffraction analysis to be $UF_6NO_2$.

EXAMPLE XI

In a system as described in Example VIII, gaseous nitrogen dioxide was allowed to flow continuously into gaseous uranium hexafluoride at 100 millimeters mercury pressure at room temperature. The uranium hexafluoride was always in excess during reaction and the flow of nitrogen dioxide was stopped before the flow of uranium hexafluoride. Excess uranium hexafluoride gas remaining in the glass bulb reactor was then removed and the solid product was collected and found to weigh 31 grams. Chemical analysis for the $UF_6NO_2$ was: U, 59.62 percent; F, 28.7 percent; N, 3.50 percent. An X-ray diffraction pattern of the solid was obtained and was found to be the same as that in Example VIII.

The solid products formed here and in Examples VIII and X were in all cases characterized as a yellowish-white solid having a vapor pressure of less than 1 millimeter Hg at 25° C. It undergoes relatively slow hydrolysis in air and rapid hydrolysis with excess water to form nitric and hydrofluoric acids and substantially equal molar quantities of uranium tetrafluoride and uranyl fluoride, suggesting the following reaction:

$$UF_6NO_2 + 2HOH \rightarrow \tfrac{1}{2}UF_4 + \tfrac{1}{2}UO_2F_2 + HNO_3 + 3HF$$

This compound identified by formula as $UF_6NO_2$ was named nitrylium hexafluorouranate. It is soluble in anhydrous hydrogen fluoride and insoluble in carbon tetrachloride. Its solid density as determined by volume displacement in carbon tetrachloride is about 3.9 grams per cubic centimeter. Nitrylium hexafluorouranate gives a characteristic X-ray diffraction pattern which different than $UF_6NO$. Its infrared spectrum shows a strong, sharp absorption peak at 2386 cm.$^{-1}$ and a very strong broad band at 613 to 455 cm.$^{-1}$ with the center at about 524 cm.$^{-1}$.

Nitrylium hexafluorouranate is unaffected by contact with chlorine trifluoride at 60 to 90° C. for one hour. Like nitrosylium hexafluorouranate, $UF_6NO$, nitrylium hexafluorouranate, $UF_6NO_2$, dissolved in anhydrous hydrogen fluoride can be completely converted to $UF_6$ by reaction at 25° C. with $ClF_3$ at a $ClF_3/UF_6NO_2$ mole ratio of about three. Nitrylium hexafluorouranate can be reduced to uranium tetrafluoride at a temperature in the range 200 to 300° C. It is converted to nitrosylium hexafluorouranate by reaction with liquid or gaseous dinitrogen tetraoxide at 25° C. as represented by the following equation:

$$UF_6NO_2 + N_2O_4(l)(g) \rightarrow UF_6NO + \tfrac{1}{2}O_2 + N_2O_4(l)(g)$$

This reaction takes place at $N_2O_4$ pressures as low as 50 millimeters mercury. However, for fast conversion the $N_2O_4$ pressure should be at least about 500 millimeters mercury.

EXAMPLE XII

A series of experiments were conducted in which uranium hexafluoride gas was brought into contact with a mixture of gaseous dinitrogen tetroxide and nitrogen dioxide, the only variable being the pressure of the mixture. The reactions were conducted in a system such as described in Example VIII. The reactants were contacted for a period ranging from 3 to 5 minutes. A large pressure drop occurred in the reactor within a few seconds after contact of the gaseous reactants. A summary of the results is shown in Table II.

TABLE II.—DEPENDENCE OF PRODUCT ON PRESSURE OF NITROGEN OXIDE MIXTURE

| Pressure, mm. Hg | | Product analysis | |
|---|---|---|---|
| $UF_6$ | Nitrogen oxide mixture | Percent U (total) | X-ray |
| 100 | 100 | 59.80 | $UF_6NO_2$ |
| 100 | 200 | 60.29 | $UF_6NO_2$, $UF_6NO$ |
| 100 | 400 | 61.47 | $UF_6NO_2$, $UF_6NO$ |
| 100 | 600 | 61.66 | $UF_6NO_2$, $UF_6NO$ |
| 100 | 700 | 62.47 | $UF_6NO$ |
| 100 | 800 | 62.10 | $UF_6NO$ |

It will be seen that the product obtained varies with the pressure of the nitrogen oxide mixture. Thus, gaseous uranium hexafluoride at 100 mm. Hg reacts rapidly with the gaseous nitrogen oxide mixture at 100 mm. Hg to produce solid nitrylium hexafluorouranate, $UF_6NO_2$; when the nitrogen oxide mixture pressure is increased to pressures greater than 700 mm. Hg. the solid formed is nitrosylium hexafluorouranate $UF_6NO$. At intermediate nitrogen oxide mixture pressures, a mixture of the two solids is produced.

EXAMPLE XIII

This example illustrates the applicability of this invention to separating uranium hexafluoride from a gaseous stream containing a variety of gaseous and volatile contaminants.

In this example the reaction to be described was conducted in a system consisting of a source of NO and a gas mixture supply containing $UF_6$, each source being connected by suitable conduits into a tower reactor where the gas streams were allowed to mix. The reactor consisted of a flanged gas-tight nickel tube containing an electrostatic precipitator to permit collection of small solid particles. The tower also had an exit conduit containing a metal filter to trap any solid particles not collected by the action of the electostatic precipitator. In this system, a gaseous mixture containing 4.3 mole percent of uranium hexafluoride, 0.15 mole percent tungsten hexafluoride, 0.1 mole percent molybdenum hexafluoride, 1.25 mole percent fluorine, 0.8 mole percent chlorine trifluoride, 9.9 mole percent dichlorotetrafluoroethane, 4 mole percent oxygen and 80 percent nitrogen was reacted with nitric oxide in the nickel reactor. The flow system was operated at room temperature and slightly above atmospheric pressure. The gas mixture entered the reactor at a flow rate of about 1000 cc. per minute and the nitric oxide entered at a flow rate of about 190 cc. per minute. The mole ratio of nitric oxide to uranium hexafluoride was 4.

The gas stream from the exit conduit of the reactor was collected and analyzed and found to contain less than $2 \times 10^{-5}$ mole percent uranium hexafluoride (about 0.2 part per million). The solid product deposited in the tower reactor by the action of the electrostatic precipitator and any solids not so deposited were trapped by the metal filter. The solids as collected were analyzed by chemical and X-ray diffraction means. The solid was found to consist principally of $UF_6NO$ with trace impurities of molybdenum and tungsten compounds.

EXAMPLE XIV

This example was conducted in the same manner and using a gas mixture of the same composition as in Example XIII except that nitrogen dioxide was substituted for nitric oxide. The gas stream exiting from the flow system contained about $10^{-4}$ percent by volume $UF_6$ (about 1 part per million). The solid product collected was identified as $UF_6NO$ with trace impurities of molybdenum and tungsten compounds.

EXAMPLE XV

A gas mixture consisting of 6.5 mole percent $UF_6$, 5 mole percent $F_2$, and the balance dry air was reacted with nitrogen dioxide at a temperature of about 100° C. in a system such as the one described in Example XIII. The mole ratio of nitrogen dioxide to uranium hexafluoride was 4. A solid product was formed and collected. The solid product was found to be $UF_6NO$ as identified by chemical and X-ray analyses.

In view of the foregoing, it will be evident that I provide a new and novel class of compounds, nitrosylium and nitrylium hexafluorouranate, and a method of making these compounds as exemplified by the foregoing examples. The unique combination of physical and chemical characteristics of these compounds provides a way of safely and economically handling, storing and shipping uranium hexafluoride. Since the compounds of this invention are solid, are unreactive with many of the common container materials, such as glass, aluminum, nickel, and are solids of very low vapour pressure, all that is required is that the solid be stored in a container made of glass, polyethylene, nickel or other non-reactive material and that the container atmosphere not occupied by the $UF_6N(O)_x$ be filled with a dry inert gas, such as dry air. The problems involved in storing, handling and shipping large volumes of a highly volatile, reactive, and corrosive material such as $UF_6$ are well known to those skilled in the art. It will be equally evident to those skilled in the art that by the present invention all of the problems involved in handling $UF_6$ are either materially reduced or eliminated when the $UF_6$ is converted to $UF_6N(O)_x$. This conversion to $UF_6N(O)_x$, as has been demonstrated by the preceding examples, is simple, rapid and virtually complete under moderate reaction conditions. Equally significant is the ease with which one may regenerate $UF_6$ from this product.

Thus, after trans-shipment from one location to another or after removal from storage, should the need for $UF_6$ arise, the $UF_6N(O)_x$ produced is dissolved in hydrogen fluoride and is reacted with a selected fluorinating agent, at room temperature, to obtain the desired $UF_6$. Thus, handling, storage, and shipping uranium hexafluoride in the form of a solid $UF_6N(O)_x$ product would be simple, safe, and more economical. Problems associated with the hazards of safely and economically filling cylinders of $UF_6$ would be eliminated. The need for expensive, heavy, high-pressure metallic cylinders in handling $UF_6$ would also be eliminated since $UF_6N(O)_x$ product is solid.

A major advantage of the present invention is that it provides a simple and economical process of removing $UF_6$ contained in gas streams by treatment of the gas stream with nitrogen oxides. The simplicity and selectivity of the process as well as the relatively simple apparatus needed to conduct the process provide a major contribution to the art of separating and purifying uranium hexafluoride from a mixed gas stream.

An additional advantage which this invention provides is the relative ease with which uranium tetrafluoride may be produced from $UF_6$. It has been found that the reduction of $UF_6$ with hydrogen is slow and incomplete at a temperature as high as 600° C., even with the use of a variety of catalysts. However, in accordance with the present invention a simple two-step route is provided whereby substantially complete conversion of $UF_6$ to $UF_4$ may be accomplished with $H_2$ or other suitable reducing gas at a temperature in the range 200 to 350° C.

Since many embodiments may be made of the invention hereinbefore described and since many variations may occur to those skilled in the art in view thereof, it will be clearly understood that the scope of this invention is not to be limited to the particulars herein disclosed, but is to be defined by the following claims.

1. Nitrosylium hexafluorouranate having the empirical formula $UF_6NO$.

2. Nitrylium hexafluorouranate having the empirical formula $UF_6NO_2$.

3. A new uranium compound having the formula $UF_6N(O)_x$ where $x$ is a number from 1 to 2.

4. As a new compound, nitrosylium hexafluorouranate having an empirical formula $UF_6NO$, said compound being further characterized in that it is a greenish-white solid, stable without decomposition in dry air up to a temperature of about 150° C.; it has a vapour pressure of less than 1 millimeter mercury at 25° C.; it has a solid density, as determined by volume displacement in carbon tetrachloride, of about 4.3 grams/cc.; it is soluble in hydrogen fluoride and aqueous solutions thereof; its infrared spectrum shows absorption peaks at 508, 550 and 2330 reciprocal centimeters, respectively; and it is hydrolyzed by water to produce equimolar quantities of uranium tetrafluoride and uranyl fluoride.

5. As a new compound, nitrylium hexafluorouranate having an empirical formula $UF_6NO_2$, said compound being further characterized in that it is a yellowish-white solid stable without decomposition in dry air up to about 150° C.; it has a vapour pressure of less than 1 millimeter mercury at 25° C.; it has a solid density, as determined by volume displacement in carbon tetrachloride, of about 3.9 grams per cubic centimeter; it is soluble in hydrogen fluoride; its infrared spectrum shows a sharp absorption peak at 2386 reciprocal centimeters and a strong absorption band in the range 613–455 reciprocal centimeters, with its center at about 524 reciprocal centimeters; and it is readily convertible to nitrosylium hexafluorouranate by reaction with dinitrogen tetroxide.

6. In a method of separating uranium hexafluoride from a gaseous mixture containing said uranium hexafluoride and extraneous gaseous impurities, the steps which comprise reacting said mixture with an oxide of nitrogen having an atomic ratio of oxygen to nitrogen at least equal to one, and thereafter recovering a solid compound having the formula $UF_6N(O)_x$ where $x$ is a number from 1 to 2.

7. The method according to claim 6, wherein the nitrogen oxide is nitric oxide.

8. In a method of recovering uranium hexafluoride from a gaseous mixture containing said uranium hexafluoride and extraneous gaseous impurities, the steps which comprise contacting said mixture with an oxide of nitrogen having an atomic ratio of oxygen to nitrogen equal to at least one to form a solid compound having the formula $UF_6N(O)_x$ where $x$ is a number from 1 to 2, dissolving said compound in hydrogen flloride, contacting the resultant solution with chlorine trifluoride at a temperature of about 25° C., and thereafter collecting the resultant hexafluoride product.

9. In a method of recovering uranium hexafluoride from a gaseous mixture containing said uranium hexafluoride and extraneous gaseous impurities, the steps which comprise contacting said mixture with an oxide of nitrogen having an atomic ratio of oxygen to nitrogen equal to at least one to form a solid compound having the formula $UF_6N(O)_x$ where $x$ is a number from 1 to 2, contacting said solid compound with gaseous fluorine at a temperature of about 375 to 400° C., and thereafter collecting the resultant hexafluoride product.

10. In a method of converting uranium hexafluoride to uranium tetrafluoride, the steps which comprise contacting said uranium hexafluoride with an oxide of nitrogen having an atomic ratio of oxygen to nitrogen at least equal to one to produce a solid compound having the formula $UF_6N(O)_x$ where $x$ is a number from 1 to 2, contacting said compound with a gaseous reductant, cooling the resultant mixture and thereafter recovering uranium tetrafluoride therefrom.

11. In a method of converting uranium hexafluoride to uranium tetrafluoride, the steps which comprise contacting said uranium hexafluoride with an oxide of nitrogen having an atomic ratio of oxygen to nitrogen at least equal to one to produce a solid compound having the formula $UF_6N(O)_x$ where $x$ is a number from 1 to 2, contacting said solid compound with gaseous hydrogen at a temperature in the range 200 to 350° C., cooling the reaction mixture and thereafter recovering uranium tetrafluoride therefrom.

12. In a method of converting uranium hexafluoride to uranium tetrafluoride, the steps which comprise contacting said uranium hexafluoride with an oxide of nitrogen having an atomic ratio of oxygen to nitrogen at least equal to one to produce a solid compound having the formula $UF_6N(O)_x$ where $x$ is a number from 1 to 2, contacting said solid compound with gaseous carbon monoxide at a temperature in the range 200 to 350° C., cooling the reaction mixture and thereafter recovering uranium tetrafluoride thereform.

13. In a method of separating uranium hexafluoride from a gaseous mixture containing said uranium hexafluoride and extraneous gaseous impurities, the steps which comprise contacting said mixture with nitrogen dioxide and thereafter recovering a solid compound having the formula $UF_6N(O)_x$ where $x$ is a number from 1 to 2.

14. In a method of separating uranium hexafluoride from a gaseous mixture containing said uranium hexafluoride and extraneous gaseous impurities, the steps which comprise contacting said mixture with dinitrogen tetroxide and thereafter recovering a solid compound having the formula $UF_6N(O)_x$ where $x$ is a whole number from 1 to 2.

15. A method of converting a compound having the formula $UF_6N(O)_x$ where $x$ is a number from 1 to 2 to a molecular species of uranium wherein the oxidation state of uranium in said species is different from the oxidation state of uranium in said compound which comprises reacting said compound with a reagent selected from the group consisting of $F_2$, $ClF_3$, $H_2$, CO and $SO_2$.

16. In a method of converting uranium hexafluoride to uranium tetrafluoride, the steps which comprise contacting said uranium hexafluoride with an oxide of nitrogen having an atomic ratio of oxygen to nitrogen at least equal to one to produce a solid compound having the formula $UF_6N(O)_x$ where $x$ is a number from 1 to 2, forming an aqueous acidic solution of said compound, heating said solution up to a temperature of about 90° C. while passing gaseous sulfur dioxide therethrough, cooling the resultant solution and thereafter separating a precipitate of uranium tetrafluoride therefrom.

References Cited

UNITED STATES PATENTS

| | | | |
|---|---|---|---|
| 2,830,873 | 3/1958 | Katz et al. | 23—14.5 AX |
| 2,907,629 | 10/1969 | Smiley et al. | 23—14.5 AX |
| 2,907,630 | 10/1959 | Lawroski et al. | 23—14.5 AX |

OTHER REFERENCES

Katz et al., "Chemistry of Uranium" pp. 440–449.

Mellor, "Comprehensive Treatise on Inorganic and Theoretical Chemistry," vol. 12, pp. 75, 76 (1932.

CARL D. QUARFORTH, Primary Examiner

F. M. GITTES, Assistant Examiner

U.S. Cl. X.R.

23—326, 334, 352, 353